United States Patent [19]

Ejiri et al.

[11] Patent Number: 4,949,703

[45] Date of Patent: Aug. 21, 1990

[54] LIQUID HEATING APPARATUS OF THE PULSE COMBUSTION TYPE

[75] Inventors: Susumu Ejiri; Makoto Kimura, both of Nagoya, Japan

[73] Assignee: Paloma Kogyo Kabushiki Kaisha, Nagoya, Japan

[21] Appl. No.: 401,914

[22] Filed: Sep. 1, 1989

[30] Foreign Application Priority Data

Sep. 2, 1988 [JP]   Japan ............................. 63-116333[U]

[51] Int. Cl.⁵ ............................................... F24H 1/00
[52] U.S. Cl. .................................... 126/360 R; 431/1; 126/391
[58] Field of Search .................. 431/1; 126/391, 343.5, 126/360 R

[56] References Cited

U.S. PATENT DOCUMENTS

| | | | |
|---|---|---|---|
| 4,241,723 | 12/1980 | Kitchen | 431/1 |
| 4,619,601 | 10/1986 | Sumitani | 431/1 |
| 4,628,903 | 12/1986 | Farnsworth et al. | 126/391 |
| 4,808,107 | 2/1989 | Yokoyama et al. | 431/1 |

Primary Examiner—Carroll B. Dority
Attorney, Agent, or Firm—Berman, Aisenberg & Platt

[57] ABSTRACT

A liquid heating apparatus of the type which includes a liquid vessel assembled within a support frame, a pulse combustion burner mounted to the vessel and having a combustion chamber secured at its inlet end to a side wall of the vessel and immersed in liquid in the vessel, a tailpipe connected at its one end to an exhaust port of the combustion chamber and being extended outwardly through the vessel, and an exhaust muffler assembly connected to an exhaust end of the tailpipe. The exhaust muffler assembly includes a plurality of mufflers connected in series to the exhaust end of the tailpipe, a final one of the mufflers being in the form of a resonance type muffler for reducing low frequency noises caused by pulse combustion in the combustion chamber. The final one of the mufflers is detachably mounted in place at the outside of the support frame for easy replacement with another resonance type muffler and connected to the preceding muffler in a disengageable manner.

3 Claims, 1 Drawing Sheet

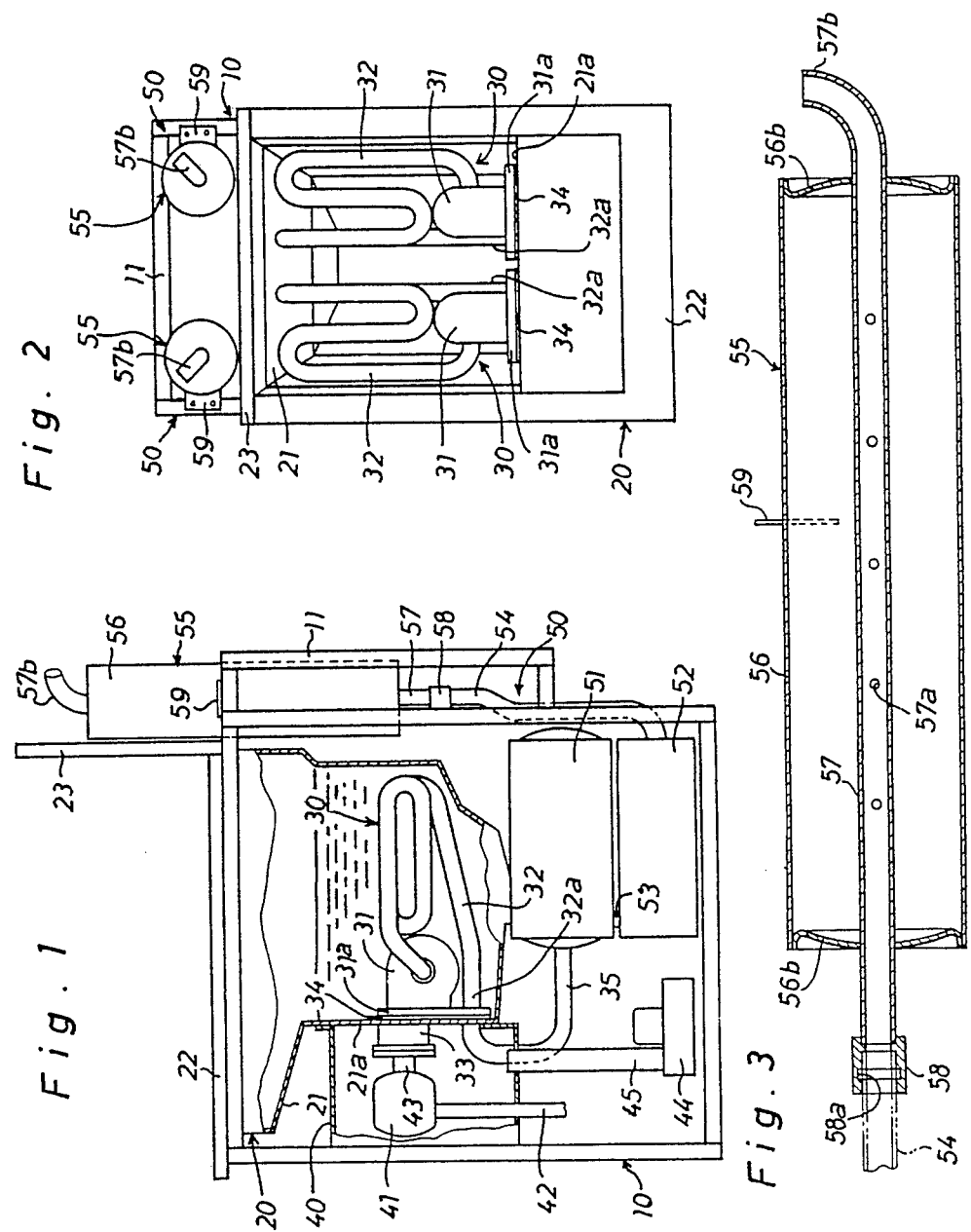

LIQUID HEATING APPARATUS OF THE PULSE COMBUSTION TYPE

BACKGROUND OF THE INVENTION

1. Field of the Invention

The present invention relates to a liquid heating apparatus, more particularly to a liquid heating apparatus of the type in which a pulse combustion burner is mounted to a liquid vessel to heat an amount of liquid such as cooking oil or other fluid medium stored therein.

2. Description of the Prior Art

In such a conventional liquid heating apparatus as described above, the liquid vessel is assembled within a support frame, and the pulse combustion burner includes a combustion chamber secured at its inlet end to an internal surface of a forward side wall of the vessel in a liquid-tight manner and immersed in liquid in the vessel. The combustion chamber of the burner has an exhaust port connected to a tailpipe the great part of which is immersed in the liquid. The tailpipe extends outwardly through a rearward side wall or bottom wall of the vessel and is connected at its exhaust end to a muffler assembly which is fixedly mounted in place within the support frame in a non-exchangeable manner.

During operation of the pulse combustion burner, medium and high frequency noises are caused by impact sounds of flapper valves in an air-fuel mixer head of the burner and mechanical vibration of other component parts of the burner. Additionally, low frequency noises are caused by pulse combustion in the combustion chamber. For effective reduction of the medium and high frequency noises, it is desirable to adapt a muffler of the expansion and resonance type to the burner. For reduction of the low frequency noises, it is desirable to adapt a resonance type muffler to the burner. The noise reduction range of the resonance type muffler is, however, very narrow. On the other hand, the combustion frequency of the burner will change in a range of approximately 80–100 hertzs in accordance with the component of used gaseous fuel. In the case that the used gaseous fuel contains a relatively large amount of hydrogen components, the combustion frequency of the burner becomes large. For this reason, such a resonance type muffler as described above does not effect to reduce the low frequency noises in accordance with the component of used gaseous fuel.

SUMMARY OF THE INVENTION

It is, therefore, a primary object of the present invention to provide an improved liquid heating apparatus to which a resonance type muffler is assembled in an exchangeable manner to effectively reduce the low frequency noises in accordance with the component of used gaseous fuel.

According to the present invention, the object is attained by providing a liquid heating apparatus of the pulse combustion type which comprises a liquid vessel assembled within a support frame to store an amount of liquid such as cooking oil or other fluid medium to be heated, a pulse combustion burner mounted to the vessel and having a combustion chamber secured at its inlet end to a side wall of the vessel and immersed in the liquid in the vessel, a tailpipe connected at one end thereof to an exhaust port of the combustion chamber in such a manner that the great part of the tailpipe is immersed in the liquid in the vessel and being extended outwardly from the vessel, and an exhaust muffler assembly connected to an exhaust end of the tailpipe to permit combustion products exhausted therethrough from the tailpipe, wherein the exhaust muffler assembly includes a first muffler in the form of a decoupler connected to the exhaust end of the tailpipe for stabilizing pulse combustion in the combustion chamber, a second muffler connected in series at its inlet to the first muffler for reducing medium and high frequency noises applied thereto, and a third muffler in the form of a resonance type muffler connected in series at its inlet to the second muffler for reducing low frequency noises caused by pulse combustion in the combustion chamber, and wherein the third muffler is detachably mounted in place at one side of the support frame for replacement with another resonance type muffler and connected to the second muffler in a disenageable manner.

In a practical embodiment of the present invention, a plurality of spare mufflers are prepared to be replaced with the third muffler in accordance with the component of used gaseous fuel. In the heating apparatus, one of the prepared spare mufflers is selected as the third muffler in accordance with the component of used gaseous fuel to effectively reduce low frequency noises caused by combustion of the fuel. In the case that the component of gaseous fuel has been changed to another component, the third muffler is replaced with one of the prepared spare mufflers which is effective to reduce low frequency noises caused by combustion of the changed gaseous fuel. For easy replacement with a selected one of the prepared spare mufflers, the third muffler is adapted as a final muffler and is detachably mounted in place as described above.

BRIEF DESCRIPTION OF THE DRAWINGS

Other objects, features and advantages of the present invention will be more readily appreciated from the following detailed description of a preferred embodiment thereof when considered with reference to the accompanying drawings, in which:

FIG. 1 is a schematic side elevation view of a liquid heating apparatus in accordance with the present invention, partially shown in section to illustrate certain features of the heating apparatus;

FIG. 2 is a plan view of the heating apparatus; and

FIG. 3 is an enlarged sectional view of a resonance type muffler shown in FIGS. 1 and 2.

DESCRIPTION OF THE PREFERRED EMBODIMENT

In FIGS. 1 and 2 of the drawings, there is illustrated a liquid heating apparatus in the form of a deep fat fryer which includes an open top liquid vessel 20 of generally rectangular in shape assembled within a support frame 10 to store therein an amount of cooking oil or other fluid medium to be heated. The liquid vessel 20 has a vessel body 21 integrally formed with an upper horizontal flange 22 of rectangular in shape which is mounted on the support frame 10 to support the liquid vessel 20 in place. An upright back wall 23 is provided on the support frame 10 at the rear end of horizontal flange 22 of vessel 20. As shown in FIG. 1, the vessel body 21 has an upright forward side wall 21a which carries a pair of casings 40 secured thereto to form a pair of air intake chambers.

As shown in FIG. 2, a pair of pluse combustion burners 30 are mounted in parallel to the upright forward side wall 21a of vessel 20 and immersed in liquid in the vessel 20. The pulse combustion burners 30 each include, as main components, an air-fuel mixer head 33, a combustion chamber 31, and a tailpipe 32. Since the burners 30 are substantially the same, a detailed description of only one of the burners 30 will suffice for better understanding of the structure and operation of the fryer. The combustion chamber 31 is integrally formed at its inlet end with an attachment flange 31a which is secured to an internal surface of forward side wall 21a through a gasket 34 in a liquid-tight manner by means of screws. The tailpipe 32 has an inner end welded to an exhaust port of the combustion chamber 31 in a liquid-tight manner and is sinuously housed in the vessel 20. The tailpipe 32 extends outwardly through the attachment flange 31a of combustion chamber 31 and forward side wall 21a of vessel 20 and has an exhaust end portion welded to the attachment flange 31a of combustion chamber 31 in a liquid-tight manner and connected to an extension pipe 35 having one end secured to the outside face of forward side wall 21a. The air-fuel mixer head 33 is fixedly mounted to the outside face of forward side wall 21a in an air-tight manner and is in open communication with the interior of combustion chamber 31 to supply a mixture of gaseous fuel and air thereinto.

As shown in FIG. 1, the air-fuel mixer head 33 is housed in the air chamber casing 40 and connected to a gas container 41 by means of a communication pipe 43. The gas container 41 is connected to a source of gaseous fuel (not shown) by means of a gas supply conduit 42. The gas supply conduit 42 is provided therein with an electromagnetic valve (not shown) for control of the flow quantity of gaseous fuel supplied therethrough into the gas container 41 and is connected to the source of gaseous fuel through an intake muffler (not shown). The communication pipe 43 is provided therein with a flapper valve (not shown) for permitting only the flow of gaseous fuel supplied therethrough into the mixer head 33. The air chamber casing 40 encloses the mixer head 33 and gas container 41 and is connected to an electrically operated air blower 44 through an air supply pipe 45. In a practical embodiment, the air blower 44 may be connected in common to both the air chamber casings 40 or connected to them, respectively. The air from pipe 45 is supplied into the mixer head 33 through a flapper valve (not shown) provided thereon in a conventional manner.

As shown in FIGS. 1 and 2, an exhaust muffler assembly 50 is connected to the respective extension pipes 35 of the burners 30. The exhaust muffler assemblies 50 each include a first muffler 51 located just below a rear bottom portion of the vessel 20 in a horizontal direction and connected at its inlet to the extension pipe 35, a second muffler 52 located in parallel with the first muffler 51 and connected in series at its inlet to the first muffler 51 through a pipe 53, and a third upright muffler 55 located behind the vessel 20 and upright back wall 23 and being detachably connected in series at its inlet to the second muffler 52 through an upwardly extending pipe 54. The first muffler 51 has an expansion chamber of large capacity formed therein and is arranged to act as a decoupler for stabilizing pulse combustion in the combustion chamber 31 and for absorbing combustion noises applied thereto. The second muffler 52 is arranged to reduce medium and high frequency noises applied thereto. The first and second mufflers 51 and 52 are housed in a compact arrangement within the interior of support frame 10.

As shown in FIG. 3, the third muffler 55 is composed of a cylindrical body 56 hermetically closed at its opposite ends by means of end plates 56b secured thereto, and an exhaust pipe 57 extending through the center of cylindrical body 56 and secured to the end plates 56b. The cylindrical body 56 has a mounting bracket 59 welded thereto for attachment to an upper end of a sub-frame 11 fixed to the rear end of support frame 10. The exhaust pipe 57 has one end to which secured is a pipe joint 58 for connection to the upper end of upwardly extending pipe 54 and the other end in the form of a curved tailpipe 57b for exhausting combustion products therethrough to the exterior. The exhaust pipe 57 is formed with a plurality of axially spaced small holes 57a in open communication with the interior of cylindrical body 56. Thus, the third muffler 55 is arranged to act as a resonance type muffler for attenuating low frequency noises applied thereto. The silencing characteristic of the third muffler 55 is effective in a resonant frequency range defined by the capacity of cylindrical body 56 and the opening area and number of small holes 57a in exhaust pipe 57.

In a practical embodiment of the heating apparatus, a plurality of resonance type spare mufflers are prepared to be replaced with the third muffler 55 in accordance with the component of used gaseous fuel. In the preparation of the spare mufflers, the diameter and number of small holes 57a in exhaust pipe 57 are changed without variation in construction of the cylindrical body 56 to effectively reduce low frequency noises caused by pulse combustion of the used gaseous fuel in the burner.

In assembly of the third muffler 55, an 0-ring of heat-resistant rubber is previously coupled within an internal annular groove 58a of pipe joint 58, and the cylindrical body 56 of muffler 55 is inserted into the sub-frame 11 in such a manner that the bracket 59 of body 56 is engaged with the upper end of sub-frame 11 and that the pipe joint 58 is coupled over the upper end of pipe 54. Thus, the cylindrical body 56 of muffler 55 is detachably mounted in place by means of screws threaded into the sub-frame 11 through bracket 59, and the exhaust pipe 57 of muffler 55 is connected to the pipe 54 through the 0-ring in an air-tight manner.

In operation, the electromagnetic valves in gas supply conduits 42 are opened to effect the supply of gaseous fuel into gas containers 41, while the air blower 44 is operated for a predetermined short period of time to effect the supply of air into air chamber casings 40. Thus, the mixer heads 33 are supplied with the gaseous fuel and air from gas containers 41 and casings 40 to supply a mixture of the gaseous fuel and air into the combustion chambers 31 therefrom. The mixture is ignited by energization of a spark plug (not shown) in the respective combustion chambers 31. When explosive combustion of the mixture takes place at a high temperature in both the combustion chambers 31, the flapper valves in the respective pipes 43 and mixer heads 33 are closed by a momentary positive pressure in the respective combustion chambers 31 to block the inward flow of gaseous fuel and air into the mixer heads 33, and the combustion products are exhausted through the tailpipes 32, extension pipes 35 and muffler assemblies 50. Ignition and combustion are followed by a contraction which produces a momentary negative pressure in the tailpies 32 for drawing in a fresh supply of gaseous fuel and air through the flapper valves in the respective pipes 43 and mixer heads 33. During the momentary negative pressure, the flow of combustion products at each exhaust end of the tailpipes 32 is reversed. The fresh charge which has been drawn in during the momentary negative pressure automatically ignites without the need for energization of the spark plugs, and the explosive combustion repeats itself. A resonance is established in the respective tailpipes 32 at a frequency of approximately 80–100 hertzs, and the pulse combustion burners 30 operate as a self-powered burner, respectively.

During the operation of the pulse combustion burners 30, the liquid in vessel 20 is efficiently heated by thermal exchange with the combustion products passing through the tailpipes 32, and the combustion products are exhausted into the atmospheric air through the extension pipes 35 and muffler assemblies 50. The combustion frequency of the mixture changes in accordance with the component of used gaseous fuel. In the case that the used gaseous fuel contains a relatively large amount of hydrogen components, the combustion frequency of the mixture will increase to cause low frequency noises corresponding thereto. In the heating apparatus, one of the prepared spare mufflers is selected as the third muffler 55 in accordance with the component of used gaseous fuel to effectively reduce low frequency noises caused by pulse combustion of the fuel and is previously assembled within the upright subframe 11 in such a manner as described above. In the case that the component of gaseous fuel has been changed to another component, the third muffler 55 is replaced with another one of the prepared spare mufflers which is effective to reduce low frequency noises caused by pulse combustion of the changed gaseous fuel. For easy replacement with a selected one of the prepared spare mufflers, the third muffler 55 is adapted as a final muffler and is detachably mounted within the upright sub-frame 11 at the outside of support frame 10 for easy access.

Although the preferred embodiment of the present invention has been shown and described, it should be understood that various modifications and rearrangements of the parts may be resorted to without departing from the scope of the invention as disclosed and claimed herein.

What is claimed is:

1. A liquid heating apparatus of the pulse combustion type comprising a liquid vessel assembled within a support frame to store an amount of liquid such as cooking oil or other fluid medium to be heated, a pulse combustion burner mounted to said vessel and having a combustion chamber secured at its inlet end to a side wall of said vessel and immersed in the liquid in said vessel, a tailpipe connected at one end thereof to an exhaust port of said combustion chamber in such a manner that the great part of said tailpipe is immersed in the liquid in said vessel and being extended outwardly from said vessel, and an exhaust muffler assembly connected to an exhaust end of said tailpipe to permit combustion products exhausted therethrough from said tailpipe, wherein said exhaust muffler assembly includes a first muffler in the form of a decoupler connected at its inlet to the exhaust end of said tailpipe for stabilizing pulse combustion in said combustion chamber, a second muffler connected in series at its inlet to said first muffler for reducing medium and high frequency noises applied thereto, and a third muffler in the form of a resonance type muffler connected in series at its inlet to said second muffler for reducing low frequency noises caused by pulse combustion in said combustion chamber, and wherein said third muffler is detachably mounted in place at one side of said support frame for replacement with another resonance type muffler and connected to said second muffler in a disengageable manner.

2. A liquid heating apparatus as claimed in claim 1, wherein said first muffler is located just below the bottom of said vessel in a horizontal direction, said second muffler is located in parallel with said first muffler, and said third muffler is arranged upright at one side of said support frame.

3. A liquid heating apparatus as claimed in claim 1, wherein said third muffler comprises a cylindrical body hermetically closed at the opposite ends thereof, and an exhaust pipe axially extending through the center of said cylindrical body and having one end for connection to said second muffler and the other end exposed to the atmospheric air, said exhaust pipe being formed with a plurality of axially spaced small holes in open communication with the interior of said cylindrical body.

* * * * *